United States Patent [19]

Ahm

[11] Patent Number: 4,910,911
[45] Date of Patent: Mar. 27, 1990

[54] TAPE OR PACKAGED TAPE PROVIDED ALONG THE LENGTH THEREOF WITH POCKETS CONTAINING PLANTS AS WELL AS A PROCESS FOR PRODUCING THE TAPE

[75] Inventor: Poul H. Ahm, Gran Canaria, Spain

[73] Assignee: Bentle Products AG, Zug, Switzerland

[21] Appl. No.: 298,618

[22] Filed: Jan. 18, 1989

Related U.S. Application Data

[63] Continuation-in-part of Ser. No. 796,861, Nov. 12, 1985, abandoned.

[30] Foreign Application Priority Data

Nov. 12, 1984 [DK] Denmark .............................. 5371/84

[51] Int. Cl.⁴ .......................... A01G 9/10; A01C 1/04
[52] U.S. Cl. ............................................ 47/56; 47/73
[58] Field of Search .......................... 47/56, 73, 78, 64

[56] References Cited

U.S. PATENT DOCUMENTS

| 3,172,234 | 3/1965 | Eavis | 47/56 |
| 4,329,812 | 5/1982 | Carlisle | 47/73 |
| 4,789,584 | 12/1988 | Perrin | 47/64 |

FOREIGN PATENT DOCUMENTS

| 668757 | 3/1952 | United Kingdom | 47/73 |
| 1436264 | 5/1976 | United Kingdom | 47/56 |

*Primary Examiner*—David A. Scherbel
*Assistant Examiner*—Michele A. Van Patten
*Attorney, Agent, or Firm*—Cooper & Dunham

[57] ABSTRACT

In a tape or packaged tape provided along the length thereof with pockets disposed transversely to the tape and with a desired spacing, said pockets being open at the top and the bottom and containing plants such as seedlings and beddingplants ready for transplantation together with the pockets as a continuous tape. The tape including the pockets and the plants is quite flat and bendable, windable spirally and foldable flat upon itself into a package. The pockets comprise two wall-forming thin layers of material fixed to each other at intervals and being adapted for the supply and regulation of the air and water necessary for the development and growth of the plants inside the packaged tape without the coexistence of any further growth medium thereabout. The plants are developed inside the packaged tape such and the materials of the pocket walls are selected such that the roots of the plants adhere to or penetrate into at least one of said layers, whereas the roots are prevented from penetrating through at least one of the said layers. The tensile strength of the tape is at least on Newton.

In producing the tape, a packaged tape containing viable plant material is soaked with water of a controlled pH and conductance. The soaked package is placed in a germinator box under conditions controlled as to temperature, humidity, and composition of the air and light, thereby assuring the best possible conditions for the germination and development of the roots.

Then the packaged tape is moved to a greenhouse for further development of the top of the plants under conditions controlled as to temperature and content of moisture and nutrients in the package.

In this manner there is constructed a continuous tape containing seedlings or beddingplants allowing the rational and inexpensive production of plants of a uniform, high quality, said tape in addition being suited for a direct, mechanical transplantation on the growing habitat.

8 Claims, 4 Drawing Sheets

TAPE OR PACKAGED TAPE PROVIDED ALONG THE LENGTH THEREOF WITH POCKETS CONTAINING PLANTS AS WELL AS A PROCESS FOR PRODUCING THE TAPE

This application is a continuation-in-part of application Ser. No. 796,861 filed Nov. 12, 1985 now abandoned.

FIELD OF THE INVENTION

The invention relates to a tape or packaged tape provided along the length thereof with pockets disposed transversely to the tape and with a desired spacing, said pockets being open at the top and the bottom and containing plants, such as seedlings and beddingplants ready for transplantation together with the pockets as a continuous tape, where said tape including the pockets and the plants is quite flat and bendable, and windable or foldable flat into a package, and where the pockets comprise two wall-forming layers of material fixed to each other at intervals, said wall-forming layers being adapted to enable the supply and regulation of air and water necessary for the development and growth of the plants inside the packaged tape without the coexistence of any further growth medium thereabout.

When growing gardening, forestry, and agricultural products of the kind where it is usually desired that the plants are placed with a specific mutual spacing on the habitat and harvested after a shorter or longer period, the technique used has been developed during the years in order to reduce the working costs in connection with the growing and in order to increase and improve the yield. Beyond the more general measures in this connection—such as carrying out a suitable preparation and processing of the soil or the growth medium, a suitable selection of the seed or plant material, and a suitable care of the crop through fertilizers, optional watering, combating of disease and weed, as well as parallel thereto an increasing mechanization of the working processes—intensive efforts have been made during recent years to ensure an optimum development of the plants in the first phase of their growing period. The latter has partly been performed by purposetreating the seed or plant material and partly by a more controlled initial development in purpose-packings of seedlings or plants designed to be transplanted later on one by one on the habitat. These previously known products and processes have, however, involved relatively labourrequiring and consequently expensive methods or packings having been relatively expensive and/or materialconsuming. Thus it has only been possible to obtain savings compared to those earlier production methods that are being very labour-requiring and/or very uncertain as to the growth.

BACKGROUND ART

One of the more significant improvements during recent years has been the germinator described in Danish patent application No. 1733/81. This germinator comprises a plastic cover above a hygroscopic textile in contact with a seed, a seedling or a plant cutting. Such germinators may be produced in coherent lengths and are intended for being transplanted on the permanent habitat after a controlled germination and/or growth of the plant material in a moist layer of sand after separation from the main length by cutting or tearing off. Then the plastic cover protects the roots of the plant against drying out during the period immediately following transplantation, and the roots of the plants and the plastic covers are upon the transplantation in contact with a constantly moist layer of soil, whereby a maximum of completely developed plants is obtained. In using said germinator, which is industrially producable, it is possible to ensure a high percentage of plants capable of surviving on the habitat.

It is furthermore known from GB-PS No. 1,041,133 to have a seed pack in which the seeds are encapsulated in a similar manner in pockets in a tape formed by localized adherence of two layers of material such as for instance paper, textiles, plastic film or the like materials, and where the tape is rolled up or folded into a pack. The material is stated to possess a strength sufficient for keeping together the pack after having been completely moistened and during the germination and development of the seeds in the pack into plants ready for transplantation. Subsequently, the pack is opened and the plants are removed and transplanted one by one into the soil or a similar growth medium. It is furthermore known that the layers of material are of such a nature that the roots of the plants do not stick thereto so that the plants can be removed from the tape without damaging said roots.

SUMMARY OF THE INVENTION

The object of the invention is to provide a tape or a packaged tape of the kind stated above and which is inexpensive to manufacture, and which allows a hitherto unsurpassed efficient, and mechanized control of the production of the tape and of the germination and forcing of the plants contained in the tape, as well as of the transport and placing or transplanting of the plants on the permanent habitat while simultaneously ensuring a high percentage of usable plants.

In my co-pending application Ser. No. 298,181 filed together with this application as another CIP-application U.S. Ser. No No. 796,861, now abandoned, I have disclosed and claimed a tape or packaged tape with pockets containing viable plant material and being characterized in that the pockets comprise a first thin layer and a second thin layer of wall-forming materials being fixed to each other at intervals, and wherein said walls of the pockets are adapted to enable the necessary supply and regulation of air and water for the development of the plant material inside the tape without the coexistence of any further growth medium thereabout, at least one of the layers being adapted to prevent the roots of the plants from penetrating through said layer upon the development of said plant material, and at least one of the layers being adapted to secure the plants inside the pockets by allowing the roots to penetrate into or adhere to said layer, said pockets further being open at the top and bottom thereof, the tape including the pockets and the viable plant material being quite flat and bendable, windable spirally and foldable flat upon itself into a package, the tape in the longitudinal direction further having a tensile strength of at least 1,5 Newton, leaving a tensile strength of at least one Newton at the time of transplantation, enabling it to stand a mechanical treatment including a fully automatic transplantation of the tape by pulling it out from a spirally wound or folded package and leading it down into the soil.

The tape or packaged tape of this invention is characterized in that the plants are developed and grown such inside the packaged tape and the material of the layers of the pockets are selected such that the roots of the plants adhere to or penetrate into at least one of said layers, whereas the roots are prevented from penetrating through at least one of said layers, and wherein the tape in the longitudinal direction further has a tensile strength of at least 1 Newton, thereby enabling it to stand a mechanical treatment including a fully automatic transplantation of the tape by pulling it out from a spirally wound or folded package and leading it down into the soil.

The nature and the shape of the materials used for the tape and the shape of the tape itself with a small material thickness without any particular growth medium inbetween or around it render it possible to produce the tape at an unusually low unit price or price per plant compared to the previously known systems. As the tape furthermore is windable or foldable, and as the pockets are open to the top and the bottom, it is thereby rendered possible for the plants to grow beyond the edges of the tape with the effect that a very high number of plants can be stored and developed inside the packaged tape at a small area. Consequently it is inexpensive to store and transport the tapes and plant materials as well as to provide facilities for a suitably controlled germination and growth additionally facilitated by the capability of the material of enabling a supply and adjustment of the required quantity of air and water. Furthermore the strength of the tape and the position at a predetermined mutual spacing of the pockets on the tape as well as their securing initially of the viable plant material and subsequently also of the plants, preferably without allowing the roots of the plants to penetrate through at least one of the pocket walls, will always make the tape suited for mechanical, optionally fully automatic handling including transplanting the tape on the permanent habitat for the plants without damaging the tape nor the plants as said plants are protected by and secured in the pockets.

The tape may be shaped in many different ways. The preferred embodiment of the tape comprises a length of tape material forming the first of the two thin wall-forming layers of the pockets and having the desired tensile strength of the tape, said first layer further preventing the roots of the plants from penetrating therethrough, the second layer of said pockets being fixed to said first layer and formed as strips of a material penetrable to the roots of the plants.

In another embodiment the tape comprises two lengths of tape material being fixed to each other with a desired spacing along the length thereof to provide the said pockets. This embodiment is of specific interest in case of plants to be transplanted close to each other in a row such as carrots and radishes.

Alternatively the tape may comprise at least one elongated supporting member having the desired tensile strength of the tape and to which the pockets containing the plants are affixed with the desired spacing. The two layers of the pockets may have been fixed to each other in a manner known per se, such as for instance by adhering, melting together, crimping or pleating, and the inserted viable plant material may have been adhered to at least one of the layers of the pocket.

The materials for the tape and the pockets are preferably selected from the group consisting of plastic film, paper, paper coated on one side thereof with a plastic membrane, paper coated on one side thereof with a wax, a fiber-reinforced material, a fiber-reinforced paper coated on one side thereof with a wax, a non-woven material, a non-woven material coated on one side thereof with a plastic membrane, a non-woven material coated on one side thereof with a wax, a layer of foamed synthetic resin coated on one side thereof with a plastic membrane, a layer of foamed synthetic resin coated on one side thereof with a wax, and a combination of said materials. The materials are considered the most applicable for the purpose. However, other materials can be used for the walls of the pockets as well as for the tape and the above elongated supporting members of the tape.

According to an advantageous embodiment of the invention the material of the pockets and the roots extending therefrom are provided with activated carbon, preferably together with a means restraining the evaporation from said pockets and roots. As a result the plants of the tape are more resistant to fungicides in the soil of the permanent habitat as well as less subjected to a drying out.

Furthermore, it is of extreme importance that the leaves of the plants are covered by a layer of activated carbon, preferably together with a means restraining the evaporation from said leaves, as such a layer protects the newly transplanted plants against being eaten by birds or other animals. In addition, the plants are protected against a drying out by the restrainment of the evaporation from the plant top.

When packaged and incorporating the developed seedlings or beddingplants ready for transplantation, the tapes facilitate the transplanting to a hitherto unsurpassed degree whether it is carried out manually, semiautomatically or fully automatically, as none of said procedures necessitate a handling of each pocket or plant separately like in the systems hitherto used. Furthermore an exact and uniform placing of the plants is ensured in a simple manner both mutually and relative to the growth medium. The tape idea according to the invention as described above renders it possible to fully automate the transplanting with a unique and advantageous result not yet previously obtainable.

Combinations of materials for the tape having shown excellent results are found in a tape, wherein the material of the first thin layer of the pockets is a paper coated on one side (the outer side) thereof with a plastic membrane, and the second thin layer of the pockets is a porous paper, and a tape, wherein the material of the first thin layer of the pockets is a fiber-reinforced paper coated on one side (the outer side) thereof with a wax layer, and the second thin layer of the pockets is a porous paper. A further advantage is according to the invention obtained by a tape wherein the wax layer is a layer of small balls of wax, said layer being water-retaining though permeable to aqueous vapor and air, the latter combination providing excellent growing conditions for the roots.

The ability of the roots to grow into the top layer of the soil upon the transplantation may be enhanced by using a tape, wherein the strips of the second layer of the pockets are fixed to the first layer of the pockets along one of their side edges transversely to the tape direction only, said pockets thereby being open to the other side and to the top and the bottom of the pocket. Such a tape is particularly advantageous in connection with some kinds of plants, especially plants having a thin radicle and a voluminous top of the plant, such as for instance lettuce plants.

Simply because the tape is suited for fully automated handling and transplanting with the industrially forced plants ready for transplantation, completely new possibilities of a rational planting of great areas with uniform growth-ensured plants are obtained while involving a minimum of labour and materials. The technique used—by which the handling of the single plants separately is replaced by the handling of the tape—renders it furthermore possible to carry out the transplanting as early as at the seed leaf stage of the plants or even before that stage, the plants in both stages being far more resistant to weather changes than larger setting plants with developed foliage leaves. Thus a greater security for healthy plants with the greatest possible yielding capacity is simultaneously obtained. Finally it is now possible to obtain an essentially improved utilization of the growth period in the fields for a series of crops not previously allowing a transplanting of pre-cultured plants in an economically justifiable manner. The latter can either lead to an earlier harvest or to an extension of the entire growth period or to both, thereby resulting in a higher yield.

Furthermore a nearly 100% efficient utilization both of the area for the permanent habitat of the plants and consequently of the substances added to the area such as fertilizers, water, and spray substances may be obtained when using a tape wherein additional replacement pockets containing plants are affixed to the tape close to pockets without plant and pockets containing unsatisfactory or destroyed plants. The additional pockets are disposed within a distance of 40% of the plant spacing, preferably within a distance of 20% of said spacing from the pockets to be compensated for. As a result an optimum uniformity of the plants in the tape as well as on the permanent habitat is, of course, also obtained. Alle these features provide an increased area yield and a better utilization of the capital and labour invested. In addition a better basis is provided for a simultaneously automated harvesting of the regularly placed and uniform plants, all resulting in a better end product.

The additional pockets may advantageously be fixed to the tape by means of an adhesive, preferably by means of a wax layer or a plastic coating of the tape itself. However, other means can also be used for the fixing, for instance staples and die stamping.

In order to facilitate a sorting out of unsuited plants and to ensure a correct replacement of pockets in the tape, the walls of said tape may comprise at least in part translucent material or at least in part transparent material. In this manner it is rendered possible to carry out an inspection of for instance a tape with germinated or partly germinated seeds, because merely by a radiation it is possible to detect and register the appearance of the plant material and the length and optionally the appearance of the root of the seedling or beddingplant developed within the tape. In addition it is rendered possible to utilize the registration as a measurement of the suitability of the plant. In this manner it is possible to perform the control of each plant and to sort out unsuited plants at a time where they have not yet reached the state ready for transplantation. This provides a longer period for performing the sorting and means that the sorting can be performed at a stage of the development of the plant where the risk of damages is reduced. Naturally, it is possible, if desired, to repeat the sorting several times.

A particularly profitable embodiment of the tape according to the invention is provided by the pockets extending all the way between opposing edges of the tape, and by the dimensions of the individual pockets having been adapted to each species of seedlings or beddingplants, among other things in such a way that the length of the pockets transverse to the longitudinal direction of the tape preferably is of approximately the same magnitude as the total expected length of the seedling or beddingplant when ready for transplantation. In this manner favourable growing conditions are provided for each plant in the tape irrespective of the species of the plant. Furthermore it is ensured that during the entire period up to some time after the transplantation, the plant is well protected against unfortunate external influences both during the handling of the tape and upon the transplantation thereof.

The above protection of the plants is furthermore ensured and additionally extended by the pocket being a carrier for the roots of the plants and/or for auxiliary additives such as fungicides, insecticides, and growth-regulating additives, such as hormones, pH-regulators, and fertilizers. As a result, an increase in or intensifying of the growth can simultaneously be obtained.

For various purposes it is profitable and advantageous when the tensile strength of the tape in the longitudinal direction of the tape before the development of the plants inside the tape is at least 1,5 Newton, thereby leaving a tensile strength of the tape at the time of the transplantation of at least 1 Newton. These tensile strengths can, however, also be 5 to 10 times higher which is preferred in some cases. In this manner it is ensured that the tape processes a strength sufficient for overcoming the loads usually arising during the automatic handling, especially during a fully automated sorting and transplanting, without thereby involving a bursting of the tape.

A further advantage is obtained by the tape according to the invention comprising end sections of a length of at least 1,0 m, preferably at least 1,5 m without any pockets therein, as the packaged tape then always is surroundable by a layer of tape without any pockets therein. In this manner all the developed plants are protected against a drying out.

The invention relates furthermore to a process for producing a tape or packaged tape provided along the length thereof with pockets containing plants ready for transplantation together with the pockets as a continuous tape. This process comprises providing a package tape provided along the length thereof with pockets disposed transversely to the tape and with a desired spacing, said pockets being open to the top and the bottom and containing viable plant material selected from the group consisting of seeds, other kinds of sproutable germs, cuttings, meristems, and tissue culture, said tape having a tensile strength of at least 1,5 Newton, soaking said packaged tape with water of a controlled pH-value and conductance—measured in micromho—, placing the soaked package of tape in a germinator box under controlled conditions as to the temperature, humidity, and composition of air and light, which assures the best possible germinating and developing conditions for the roots, transferring the package of tape with the germinated or sprouted plants to a greenhouse for further development of the top of the plants, thereby controlling the content of moisture and nutrients inside the package as well as the pH-value and the conductance around the roots of the plants. Such a process ensures that the handling of each plant or plant material is restricted to its initial placing in the tape, because during the remaining stages and the following transplantation only the tape is to be handled.

The process may furthermore be carried out manually or to a hitherto unsurpassed degree semi-automacially or fully automatically while employing a consistent industrialized control of the individual stages of the process. Such a procedure ensures very low costs per unit and a maximum germination and growth of the plant material used, and at the same time it produces uniform plants as well as allows an accurate planning as to when the plants are ready for transplantation. When seeds or other kinds of plant germs are used as starting material, it is possible and profitable to transplant the tape when the plants have reached the seed leaf stage. The seedlings are more resistant to weather changes than plants with developed foliage leaves. Because of the latter feature and the very low consumption of material per plant it is also economically advantageous and possible in practise to carry out the germination and growth of the plants at a central place and subsequently to send the tapes ready for transplantation over great distances, optionally by air.

It is furthermore practical to place the packaged tape coiled or folded in a pack such as for instance a container of polystyrene, in which a hygroscopic, finely granular porous material such as Vermiculite, Perlite or sand is placed in the bottom, said material serving to adjust the moisture and allowing a slight growth therein of the roots of the plants as well as an easy removal thereof again without breaking off said roots.

The container may be surrounded by a gas- and waterproof pack making it suited for storing dry packaged tapes with plant seeds for a long time without initiating the germination process. This container may furthermore be formed in such a manner that it is suited as a transport container, as a germination container and as a delivery container to be positioned directly in a magazine on a transplanting machine. The germination process itself can for instance be carried out by placing the germination containers in a germination chamber where an accurate control of the temperature, the moisture in the packaged tape, and the humidity as well as of the composition of the air and the light is maintained while simultaneously minimizing the consumption of energy.

The process may according to the invention further preferably comprise inspection of the tape with the developed plants as to the number of pockets without plants or with unsatisfactory or destroyed plants, by unrolling the tape and passing it through an inspection station, destroying unsatisfactory plants inside the pockets, for instance by crushing said plants, affixing additional pockets with satisfactory plants to the tape close to the pockets without satisfactory plants, for instance by adhering said pockets to the tape, and reforming the tape into a packaged tape. In this connection the plants are advantageously visually inspected under normal light conditions, or alternatively visually inspected under ultraviolet light conditions, a particular color effect in the leaves being observed of the plants.

Yet another possibility of carrying out the inspection according to the invention is to measure the length of the root or the radicle by transilluminating the unrolled tape and comparing said length with a norm, whereby the inspection is carried out at a far earlier stage of the development of the plants than is usually possible, preferably at a stage of development where the plants have not yet developed leaves.

Such an inspection may according to the invention also be carried out by a measuring of the length of the root or the radicle by another type of radiation of the tape, for instance by measuring the distribution of heat in the tape around the roots and comparing said length with a norm. The inspection and the adding of replacements pockets are advantageously carried out automatically at an inspection station, thereby saving inspection costs and minimizing the errors caused by unskilled persons.

In some cases the inspection is carried out as a sorting out and cutting off of pockets with unsuited plants. After the sorting out of pockets with unsuitable plants, the tape can be reassembled with a predetermined distance between the pockets, whereby it is possible to ensure that the tapes ready for transplantation includes nothing but pockets containing suitable plants of a uniform size and growing capacity. In this manner an efficient utilization of the following investment in labour, machinery, and remaining growing media is obtained.

When the process is carried out automatically by means of a combined measuring, cutting, and removing apparatus, through which the tape passes, and when the subsequent automatic reassembling of the remaining pockets with a predetermined spacing therebetween, it is possible to automatize the production of the final tape additionally and consequently to reduce the costs further. The above procedure, i.e. the automatic reassembly of the remaining pockets with a predetermined spacing therebetween, results in a tape ready for transplantation optionally involving the use of new additional elongated supporting members. The additional elongated supporting members can be retrieved during or after the transplantation or they can ultimately decay in the soil.

Especially in the cases where the inspection has been performed at an early stage of the development of the plant, the process comprises a further development of the plants inside the packaged tape before the transplantation of said tape, which allows further inspections of the tape at a later stage of the development of the plants.

A particularly advantageous embodiment of the process especially applying to tapes containing plants developed from plant seeds includes the steps of subjecting—after the germination but prior to the transplantation, preferably while the tape is still rolled up or folded together—the beddingplants or the seedlings to a temporary growth-regulating influence such as a retardation or a stopping of the growth by applying a specific combination of light and heat in order to restrain or stop the further development of the beddingplants or the seedlings as a countermeasure against delays arising from adverse weather conditions or by a prolonged transportation. In this manner the undesirable effects of a prolonged storage can be minimized or even eliminated, as well as an optimum condition for the establishment and growth of the plant after the transplantation can be assured. In this connection it turned out that especially seedlings of some species of plants can stand such a retardation of the growth stopping the growth for up to several weeks without influencing the quality of the final product to a significant degree. Such a process is therefore particularly advantageous and suitable in connection with the tapes and packaged tapes used where only very little room is available. A further consequence is that the establishment of the retardation of the growth involves only restricted expenses because very little tape material is used for each plant. The above feature presents extraordinary advantages beyond the known systems where plants with foliage leaves are transplanted. The growth of such plants transplanted with foliage leaves can only be restrained for a few days relative to the originally planned transplantation date. If the transplantation is restrained further the plants are unsuited and must consequently be discarded.

In connection with combatting weeds it is often a great advantage to use herbicides of the kind being absorbed through the roots of the plants. After the spreading the herbicides are further distributed and kept for a long time in the upper layer of the soil without being deteriorated but so as to kill seedlings of weed sprouting later on during at least the initial period of growth of the cultured plants. Even when spread before the transplantation of the plant tapes, such herbicides have, of course, also a tendency to destroy or at least restrain the growing of the plants. Therefore the herbicides have always presented a serious problem to the growing of cultured plants, and they cannot be used shortly before seedlings and beddingplants are transplanted.

A further process according to the invention turned out surprisingly to allow a protection of the plants against such herbicides, said process comprising after the inspection and affixing of additional pockets but prior to reforming the tape into a packaged tape, a spraying onto the pocket walls and roots penetrating therethrough of a suspension of an activated carbon in a fluid means restraining the evaporation. As a result, the effect of the herbicide is neutralized by the activated carbon around the roots of the plants. In addition, the means further restraining the evaporation reduces the necessity of the plants to absorb moisture from the soil with the effect that the flow of herbicides to the roots is minimized.

Furthermore it turned out that by the process comprising a spraying immediately before the transplantation onto the top of the plants, preferably with the tape in the packaged form, of a suspension of an activated carbon in a fluid means restraining the evaporation, it is possible to extend the above effect further and consequently to enable the plants to stand a spraying with a weed-killing herbicide all over the area without said plants being destroyed. In addition, it turned out surprisingly that the above treatment of the top of the plants has a tremendous effect as to keeping birds and other animals and insects away from the plants.

BRIEF DESCRIPTION OF THE DRAWING

The invention is described below by means of some embodiments and with reference to the accompanying drawing, in which.

DESCRIPTION OF PREFERRED EMBODIMENTS

Figure 1:
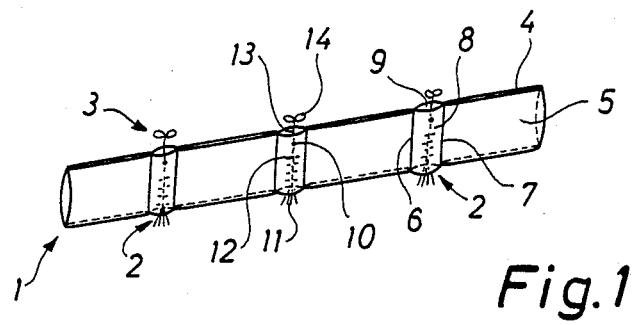
FIG. 1 illustrates a first embodiment of a tape according to the invention with seedlings sprouted inside the tape, FIG. 2 a packaged tape of the tape of FIG. 1, FIG. 3 an alternative embodiment of the tape of the invention, FIG. 4 the tape of FIG. 3 with additional pockets.

FIG. 1 illustrates a tape 1 containing pockets 2 with seedlings 3. The tape comprises two parallel lengths of material 4, 5 interconnected along joining lines 6, 7 on their respective side of the seedlings 3. Thus the resulting flat pockets 2 comprise two opposing walls 8, 9, joined at the sides, but with open top and bottom. In the drawing the thickness of the pockets and the tape has been exaggerated for the sake of clarity. In practise the tape is, however, completely flat merely with a slight bulging in the pockets solely determined by the thickness of the seedlings. For the sake of clarity the seedlings appear through the material length 5, but in practise the material lengths 4, 5 need not be transparent. The seedlings 3 have been illustrated at the stage suitable for their transplantation. In the drawing, the seed 10 of the seedling appears as well as the root 11 of the seedling with the adventitious roots 12 and the stem 13 with seed leaves 14. At the development stage illustrated of the plant, the adventitious roots of the plant adhere to the material length 4, 5 and the plant extends slightly beyond the lower and open ends of the pockets. The tape is bendable and windable or foldable and possesses a strength in the longitudinal direction of more than 1 Newton in such a manner that it is suited for advancing on machinery.

Figure 2:
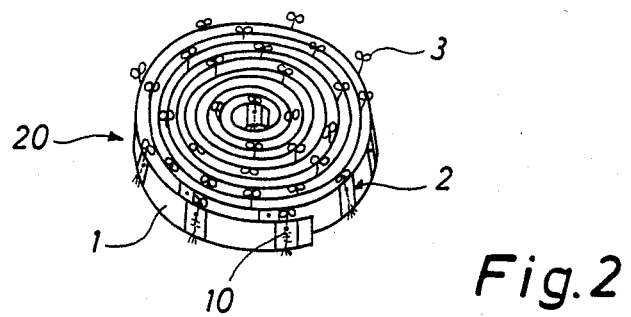

FIG. 2 illustrates a packaged tape 20 in a spirally-wound packed form of a tape 1 as illustrated in FIG. 1. As an alternative, the tape 1 can be folded into a zigzag form. The material of the tape 1 of this packaged tape comprises two thin paper lengths coated on the outside (one side thereof) with a thin plastic membrane. The membrane provides a protection for the plants by reducing the evaporation from the tape upon the transplantation as well as it prevents the roots of the plants from penetrating through the side walls 8, 9 of the pockets. Finally the membrane assists in increasing the strength of the tape.

Figure 3:
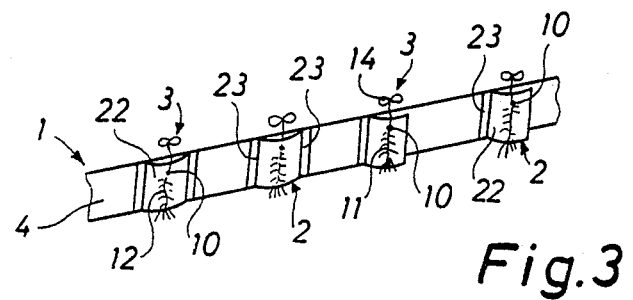

FIG. 3 illustrates a second embodiment of the tape 1 with seedlings 3. The tape comprises a single material length 4 to which the seedlings 3 adhere at a predetermined spacing, and whereby the pockets 2 are formed by the material length 4 and strips of material 22 joined therewith so as to overlay the seedlings 3. The joining procedure has been performed in stripes 23 transverse to the longitudinal direction of the tape in such a manner that the pockets 2 are open at the side edges of the tape in the same manner as illustrated in FIG. 1. FIG. 3 shows two ways of joining the strips 22 with the material length 4. The strips 22 may be joined with the material length 4 in stripes 23 at both sides of the pockets 2, cf. the two left-hand pockets of the tape of FIG. 3 or alternatively the strips 22 may be joined with the material length 4 in stripes 23 only at one side of the pockets 2, cf. the two right-hand pockets of the tape of FIG. 3, thereby leaving the pockets open to the other side thereof in addition to the top and bottom side thereof. The strips of material 22 may be of the same material as the length 4 or of a different material.

Figure 4:
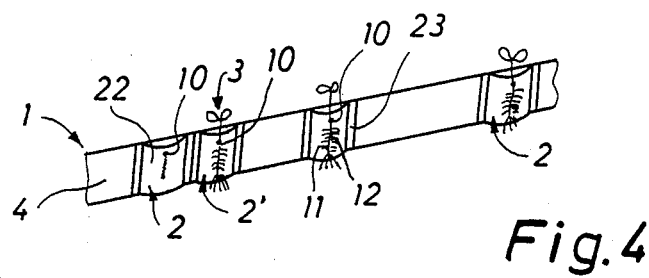

FIG. 4 illustrates a further embodiment of the tape 1 containing seedlings 3, in which an additional pocket 2' containing a seedling 3 is fixed to the tape 1 close to an original pocket 2 containing no seedling. The additional pocket 2' can be affixed to the tape by means of an adhesive, for instance by means of a wax layer or a plastic layer on the tape itself, said layer being softened and made sticky by a heating process before the adherence. The affixing of the additional pocket 2' can also be effected by means of staples or by crimping or die-stamping the pockets onto the tape.

Figure 5:
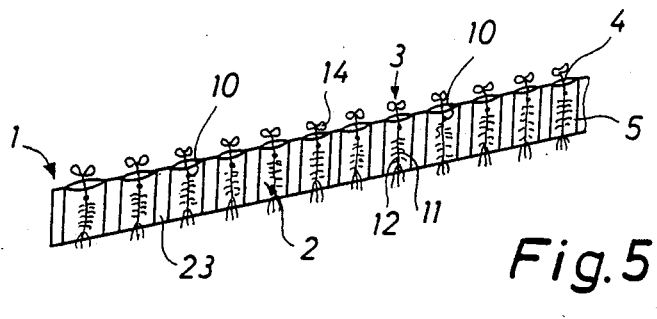
FIGS. 5 and 6 illustrate alternative embodiments of the tape according to the invention, FIG. 6 with an auxiliary tape.

FIG. 5 illustrates a further embodiment of the tape 1 containing seedlings 3. As in FIG. 1 the tape comprises two lengths 4, 5 of material interconnected in relatively close, relatively broad stripes 23 transverse to the longitudinal direction of the tape in such a manner that adjacent pockets 2 are formed in the tape.

Figure 6:
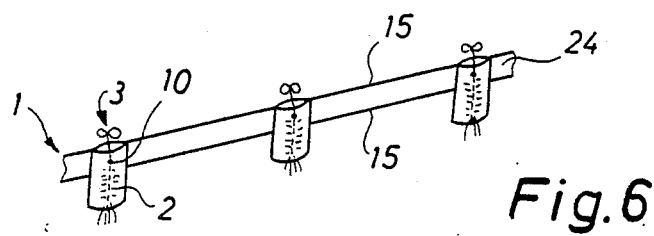

FIG. 6 illustrates yet another embodiment of the tape 1, whereby pockets 2 of the kind for instance shown in FIG. 5 have been placed at a desired mutual spacing on an auxiliary tape 24 forming an elongated supporting member. The auxiliary tape 24 of FIG. 6 is shaped as a relatively narrow tape whereas it also may be of a width corresponding to the dimension of the pockets in the direction across the tape 24. As an alternative the auxiliary tape 24 comprises one or several strings for instance placed on sites corresponding to the position of the side edges 15 shown in FIG. 6 of the auxiliary tape 24 illustrated therein.

Figure 7:
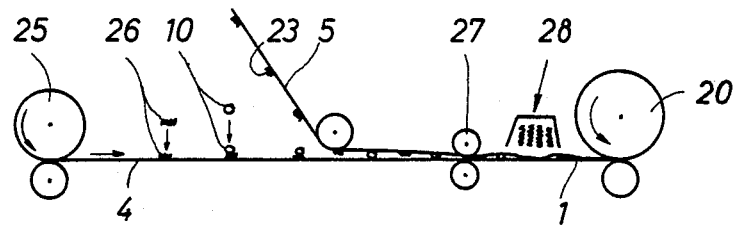
FIGS. 7 and 8 illustrate alternative processes for producing the tape and the packaged tape containing seeds.
Figure 8:
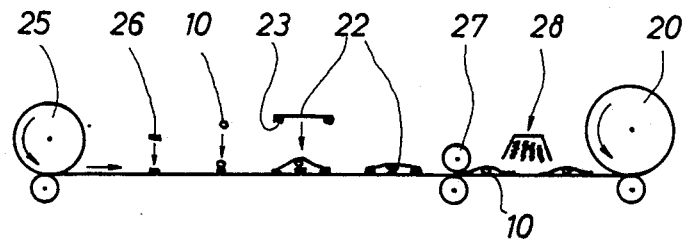

FIGS. 7 and 8 are diagrammatic views of processes for producing examples of the packaged tape containing viable plant material, which is to be used in producing the tape or packaged tape 20 of the invention. FIG. 7 illustrates a process, whereby the starting material is two lengths 4, 5 of material and the plant material is seeds 10. By this process a material length 4 is unwound from a roll 25 of material and advanced on a horizontal plane. On the top side of the length 4, small blobs 26 of glue are applied at specific intervals, whereafter a single seed 10 is placed in each blob of glue. Subsequently, a further length 5 of material is advanced over the length 4 in such a manner that together with said length 4 the length 5 surrounds the seeds 10. Stripes 23 of adhesive are applied on and transverse to the bottom side of the length 5 at intervals corresponding to the intervals between the seeds 10 on the length 4. By adjusting the two lengths 4, 5 relative to one another in the longitudinal direction thereof, the stripes 23 with adhesive are placed in the middle between the seeds 10, whereafter the two lengths are pressed together at least opposite the stripes 23 with adhesive by means of rolls 27, and the adhesive is dried and optionally cured by means of radiant heat 28 before the tape is coiled up into a packaged tape 20. The resulting tape is of the kind shown in FIG. 5 with adjacent pockets 2 separated only by the adhesive stripes 23. It is, however, also possible by this process to produce a tape of the kind shown in FIG. 1 by placing the stripes 23 with adhesive in pairs at a spacing corresponding to the width of each pocket 2 and at a spacing between the stripes 23 in pairs corresponding to the spacing between the succeeding pockets 2 in the tape 1.

FIG. 8 is also a diagrammatic view of a process, which in principle does not differ essentially from the above process of FIG. 7. The only difference is that the upper length 5 of material of FIG. 7 has been replaced by sheetshaped strips 22 of material with stripes 23 of adhesive on their bottom surface along the two opposing side edges in the transverse direction of the tape. Upon application of the glue blobs 26 and the placing of the seeds 10, the strips 22 of material are positioned over the seeds with a stripe 23 of adhesive on each side of the seed in the longitudinal direction of the tape. Subsequently, the strips 22 of material are pressed firmly onto the length 4, and the adhesive is dried and optionally cured by means of radiant heat 28. In a special embodiment of the tape, the stripe 23 of adhesive is only placed as a stripe on one side of the seed 10, thereby leaving the pocket 2 open to the other side of the seed beyond being open at the top and the bottom side, cf. the right-hand section of the tape of FIG. 3. Finally the tape 1 is coiled up into a packaged tape 20 like that of FIG. 9.

Figure 9:
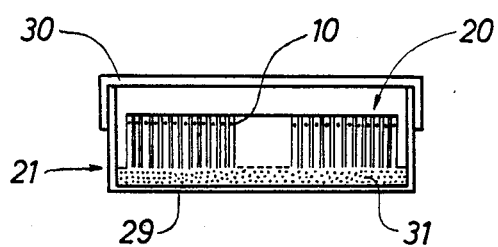
FIG. 9 is a vertical, sectional view through a germinator box for the germination of the seeds in a packaged tape containing seeds.

Upon forming the packaged tape 20, said tape is placed in a germinator box 21 of the type shown in FIG. 9. This germinator box comprises a box-shaped bottom part 29 and an associated transparent cover 30 which optionally may be a differently shaped pack impermeable to aqueous vapor. A layer of moisture-adjusting material 31, such as for instance Vermiculite, Perlite or sand is placed in the bottom of the germinator box. The packaged tape 20 can be placed on the moisture adjusting layer 31, as in FIG. 9, with the seeds 10 positioned adjacent the top edge of the strips. The germinator box 21 shown can be used both as a storing, transporting, and germinating box. The box can while containing the completely sprouted plants be placed directly in a magazine on a transplanting machine. Still while situated in the germinator box, the packaged tape 20 is exposed to a climatically and timely controlled influence which ensures the desired germination of the viable plant material and the desired root formation and development of the plants.

If it is desired to effect a sorting out of pockets with undesired plant material and plants during the germination period, the packaged tape 20 is removed from the germinator box 21, unwound and thereafter either the tape is illuminated or irradiated by a suitable radiation source, or a measurement is carried out of the distribution of heat in the tape, optionally after a short cooling of the tape (for instance by passing the tape past a cooling surface immediately prior to the measurement). In this manner it is possible to register the germination and the formation process of the roots of each plant material in the pockets, and subsequently the pockets containing undesired plant material can be cut or clipped off—i.e. the pockets containing ungerminated seeds or plant material with an insufficient formation of roots.

Figure 10:
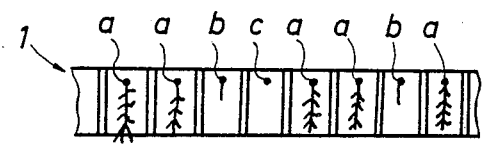
FIG. 10 illustrates a tape with partly germinated seeds.
Figure 11:
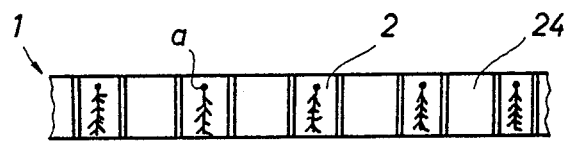
FIG. 11 illustrates an auxiliary tape with pockets transferred from the tape of FIG. 10 after a sorting out of the pockets with undesired plant material, said tape being prepared for further development in a greenhouse or for direct transplantation.

FIG. 10 illustrates part of a tape 1, whereby pockets with normally germinated seeds a, with insufficiently germinated seeds b, and with an ungerminated seed c appear. After the sorting out procedure the remaining pockets are reassembled into a tape 1 of the kind shown in FIG. 5 or FIG. 1. The tape is then rewound or refolded into a packaged tape 20 and then replaced in the germinator box 21 in order to be transplanted as such or to complete the germinating process until the seedlings 3 have reached the stage of development shown in FIG. 1, at which stage they can also be transplanted. As mentioned, the planting is carried out with the plants placed in the tape 1. However, if desired, the pockets can be removed from the tape 1 and be placed at a suitable spacing on an auxiliary tape 24, cf. FIGS. 6 and 11, said auxiliary tape then being formed into a packaged tape 20 and placed in the germinator box 21 in order to complete the germinating process.

When the tapes containing the seedlings 3 ready for transplantation cannot for some reasons be bedded out immediately in the permanent growing medium, the plants may be subjected to a retardation of the growth while they are still placed in the packaged tape. The growth retardation involves usually a lowering of the temperature and a careful control of the composition of the air, of the moisture conditions, and of the adjustment of the light. In this manner the seedlings can be stored for several weeks without lowering the quality of the final plants to a significant degree.

Though the specific description refers only to tapes derived from tapes containing seeds, and to a process for producing such tapes, many other viable plant materials can also in principle be used in producing these tapes merely by a suitable modification of the process, especially as regards the transfer of plant material to the tape and the timely and climatically controlled treatment of the packaged tape in the germinator box.

In the following the invention is further elucidated by an example in which the process of producing a tape containing seedlings of lettuce plants is disclosed.

EXAMPLE

A packaged tape of the kind described in my above copending CIP-application and as shown in FIGS. 2 and 3 of said application is selected, in which the inserted viable plant material is seeds of the lettuce plant, and wherein the seeds are disposed 10 mm below the top edge of the pockets and with a spacing of 25 cm between the pockets. The seeds are glued onto the tape material by means of a PVA-glue containing 1-6 g/l of TMTD. (TMTD=a fungizide of the type: Tetra Methyl Tiuran Disulphor).

The packaged tape is dipped into water of a pH=5.7–6.2, and a conductance, $L_T < 1600$ micromho After a short dripping off, the package is placed in an air-conditioned chamber with the top side of the pockets facing upwards and at a temperature of 17°–19° C., and a relative humidity of at least 95% for a period of 36 to 48 hours until the appearance of radicles.

Then the packaged tape is moved to a greenhouse and placed on a clean network for a period of about 12 days at a temperature of about 20°–24° C.

During the latter period, the moisture content of the packaged tape is controlled by a constant measuring of the evaporation and by adding nutrient solutions of a pH-value between 6.2–6.5 and a conductance $L_T$ between 1500 and 2000 micromho.

After a period of about 12 days, seedlings ready for transplantation have developed.

I claim:

1. A tape provided along the length thereof with pockets disposed transversely to the tape and with a desired spacing, said pockets being open at the top and the bottom, and containing plants, where said tape including the pockets and the plants is quite flat and bendable, and windable or foldable flat into a package, and where the pockets comprise two wall-forming layers of material fixed to each other at intervals, said wall-forming layers being adapted to enable the supply and regulation of air and water necessary for the development and growth of the plants inside the packaged tape without the coexistence of any further growth medium thereabout, and the material of the layers of the pockets are selected such that the roots of the plants adhere to or penetrate into at least one of said layers, and are prevented from penetrating through at least one of said layers, and wherein the tape in the longitudinal direction further has a tensile strength of at least 1 Newton, thereby enabling it to stand a mechanical treatment including a fully automated transplantation of the tape by pulling it out from a spirally wound or folded package and leading it down into the soil.

2. A tape as in claim 1, wherein additional replacement pockets containing plants are affixed to the tape close to pockets without plants and pockets containing unsatisfactory or destroyed plants.

3. A tape as in claim 2, wherein the materials for the tape and for the pockets are selected from the group consisting of plastic film, paper, paper coated on one side thereof with a plastic membrane, paper coated on one side thereof with a wax, a fiber-reinforced material, a fiber-reinforced paper coated on one side thereof with a wax, a non-woven material, a non-woven material coated on one side thereof with a plastic membrane, a non-woven material coated on one side thereof with a wax, a layer of foamed synthetic resin coated on one side thereof with a plastic membrane, a layer of foamed synthetic resin coated on one side thereof with a wax, and a combination of said materials.

4. A tape as in claim 1, wherein said tape comprises a length of tape material forming the first of the two thin wall-forming layers of the pockets and having the desired tensile strength of the tape, said first layer further preventing the roots of the plants from penetrating therethrough, the second layer of said pockets being fixed to said first layer and formed as strips of a material penetrable to the roots of the plants.

5. A tape as in claim 1, wherein said tape comprises two lengths of tape material being fixed to each other with a desired spacing along the length thereof to provide the said pockets.

6. A tape as in claim 1, wherein the tape comprises at least one elongated supporting member having the desired tensile strength of the tape and to which the pockets containing the plants are affixed with the desired spacing.

7. A tape as in claim 1, wherein the material of the pockets and the roots extending therefrom are provided with activated carbon, preferably together with a means restraining the evaporation from said pockets and roots.

8. A tape as in claim 1, wherein the leaves of the plants are covered by a layer of activated carbon, preferably together with a means restraining the evaporation from said leaves.

* * * * *